(12) United States Patent
Gurtu et al.

(10) Patent No.: US 12,229,536 B1
(45) Date of Patent: Feb. 18, 2025

(54) DEDUPLICATION OF SHARED DEPENDENCIES IN MICRO FRONTENDS

(71) Applicant: Amazon Technologies, Inc., Seattle, WA (US)

(72) Inventors: Sagar Gurtu, Seattle, WA (US); Patrick Nelson Steele-Idem, Fort Collins, CO (US); Karthick Mani, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 36 days.

(21) Appl. No.: 18/067,625

(22) Filed: Dec. 16, 2022

(51) Int. Cl.
*G06F 8/36* (2018.01)
*G06F 8/70* (2018.01)

(52) U.S. Cl.
CPC . *G06F 8/36* (2013.01); *G06F 8/70* (2013.01)

(58) Field of Classification Search
CPC ..................... G06F 8/36; G06F 8/70
See application file for complete search history.

(56) References Cited

U.S. PATENT DOCUMENTS

| | | | |
|---|---|---|---|
| 7,376,945 B1 * | 5/2008 | Kakumani | G06F 9/45537 717/135 |
| 2015/0268948 A1 * | 9/2015 | Plate | G06F 21/577 717/123 |
| 2018/0081661 A1 * | 3/2018 | Gonzalez del Solar | G06F 16/951 |

OTHER PUBLICATIONS

Altexsoft Lab, "Micro Frontend: A Microservice Approach to Developing Web UIs," www.altexsoft.com, AltexSoft LAB, May 18, 2022, accessed Jan. 16, 2023, URL: https://www.altexsoft.com/blog/micro-frontend/, 13 pages.

Bost, Bryant, "Micro-frontend Architectures on AWS," www.aws.amazon.com, Amazon Web Services, Mar. 1, 2021, accessed Jan. 16, 2023, URL: https://aws.amazon.com/blogs/architecture/micro-frontend-architectures-on- aws/, 5 pages.

ESM.SH, "Fast, Smart, Global, ESM>CDN," www.esm.sh.com, esm.sh is an open source project on GitHub maintained by @ije, under MIT License, accessed Jan. 16, 2023, URL: https://esm.sh/, 10 pages.

Geers, Michael, "Micro Frontends in Action," www.manning.com, Manning.com, URL: https://livebook.manning.com/book/micro-frontends-in-action/, 296 pages, 2020.

Jackson, Cam, "Micro Frontends," www.martinfowler.com, Martin Fowler and Thoughtworks (www.thoughtworks.com), Jun. 19, 2019, accessed Jan. 16, 2023, URL: https://martinfowler.com/articles/micro-frontends.html, 43 pages.

(Continued)

*Primary Examiner* — Geoffrey R St Leger
(74) *Attorney, Agent, or Firm* — Athorus, PLLC

(57) ABSTRACT

Described are systems and methods for deduplicating shared dependencies for micro-frontend applications. Embodiments of the present disclosure can provide hosting of shared dependencies on a networked resource, such as a content delivery network (CDN), and import statements of the shared dependencies can be replaced with calls to a network identifier specifying a network location where the shared dependencies are hosted. Accordingly, the shared dependencies can be natively imported from the network location and shared among the micro-frontend bundles.

20 Claims, 9 Drawing Sheets

(56) References Cited

OTHER PUBLICATIONS

Rappl, Florian, "Sharing Dependencies in Micro Frontends: How to share dependencies in Micro Frontends," www.blog.bitsrc.io.com, Bits and Pieces, A Medium Corporation, Jan. 8, 2020, accessed Jan. 16, 2023, URL: https://blog.bitsrc.io/sharing-dependencies-in-micro-frontends-9da142296a2b, 17 pages.
Single-Spa, "Concept: Microfrontends," www.single-spa.js.org, single-spa, accessed Jan. 16, 2023, URL: https://single-spa.js.org/docs/microfrontends-concept/, 3 pages.
Skypack, "Skypack, Load Optimized npm Packages with No Install and No Build Tools," www.skypack.dev, Skypack, Pika, accessed Jan. 16, 2023, URL: https://www.skypack.dev/, 6 pages.
UNPKG, "UNPKG," www.unpkg.com, UNPKG, Fly.io, accessed Jan. 16, 2023, URL: https://unpkg.com/, 3 pages.
Webpack, "Module Federation," www.webpack.js.org, webpack and AG Grid, OpenJS Foundation, accessed Jan. 16, 2023, URL: https://webpack.js.org/concepts/module-federation/, 10 pages.

\* cited by examiner

DEDUPLICATION OF SHARED DEPENDENCIES IN MICRO FRONTENDS

BACKGROUND

Micro-frontend architecture is oftentimes employed in the development of various frontend applications. Developing frontend applications employing a micro-frontend architecture can facilitate independent development of various features and/or fragments of the frontend application. The various features and/or fragments can be later integrated for the client as the frontend application. Accordingly, each micro-frontend feature and/or fragment that is independently developed can have its own independent build and deployment, which can facilitate efficient development of the various features and/or fragments. Although the independent build and deployment of micro-frontend features and/or fragments can provide various efficiencies in the development of such micro-frontend features and/or fragments, the independent build and deployment of such micro-frontend features typically requires their respective dependencies (e.g., on vendor libraries, etc.) to be bundled together with each micro-frontend feature and/or fragment. In implementations where multiple micro-frontends depend on the same shared library, this can result in the common shared library being loaded multiple times, thereby causing the frontend application to download heavier bundles, which can lead to latency issues and a degraded user experience.

DETAILED DESCRIPTION

Figure 1:
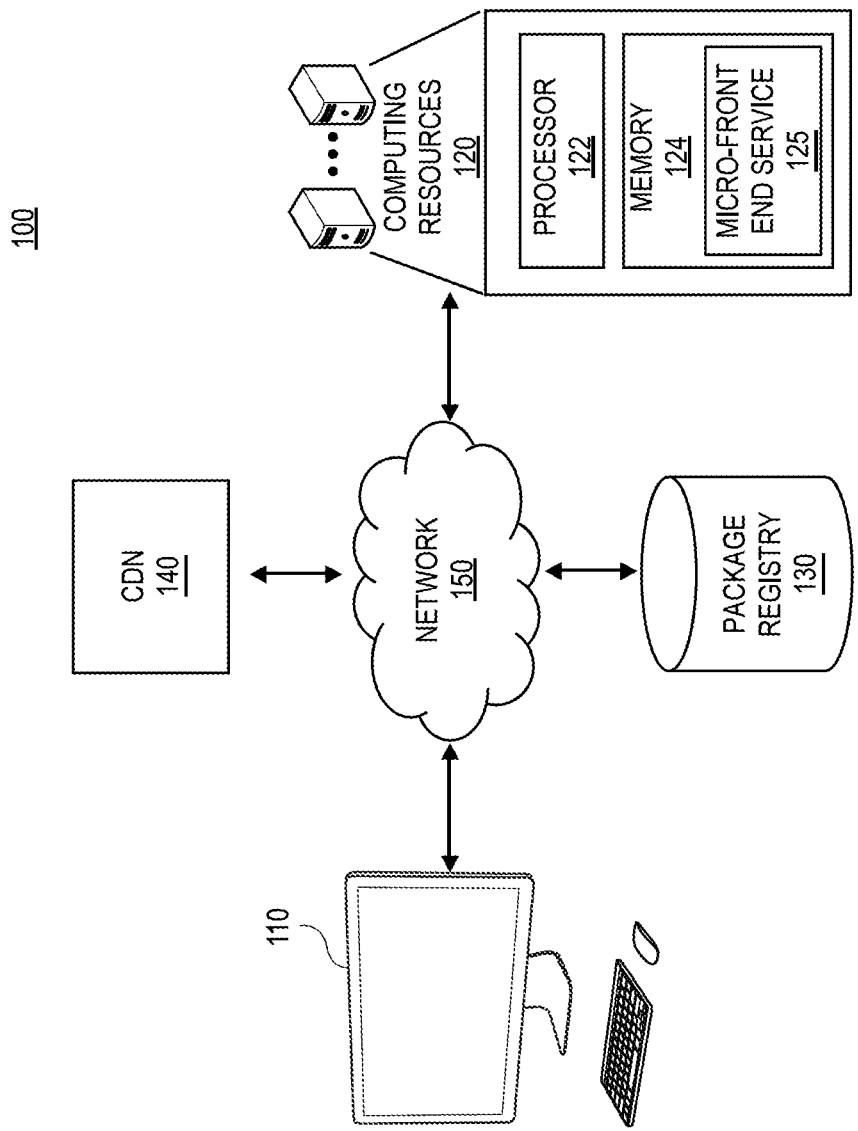
FIG. 1 is an illustration of an exemplary computing environment, according to exemplary embodiments of the present disclosure.

As is set forth in greater detail below, exemplary embodiments of the present disclosure are generally directed to systems, methods, and devices for deduplicating dependencies, such as libraries, etc., that may be shared between multiple micro-frontend bundles employed in a frontend application developed using a micro-frontend architecture.

According to exemplary embodiments of the present disclosure, shared dependencies, such as vendor libraries and the like, may be hosted on a networked computing resource, and the importation of the shared dependencies in the micro-frontend bundles may be replaced with calls to a location identifier specifying the network location where the shared dependencies are hosted, so that the micro-frontend bundles can natively import the shared dependencies from the network location and share them.

According to exemplary embodiments of the present disclosure, the dependencies that are shared between multiple micro-frontend bundles may first be obtained from a package registry/manager (NPM), such as the package manager maintained by npm. The obtained dependencies may then be processed to a module format, such as an ECMAScript module (ESM) format, so that the shared dependencies may be uploaded and hosted on a networked computing resource, such as a content delivery network (CDN). In addition to formatting the shared dependencies to a compatible format, such as ESM, the shared dependencies may be packaged into individual bundles. For example, each transitive dependency may be recursively identified and bundled into its own individual package.

Additionally, compatibility groups may also be generated for each dependency. This can include, for example, first identifying each the compatible versions of the various dependencies. Based on the various identified compatibilities, sets of compatible dependencies may be generated that may include combinations of dependency versions based on the compatibilities. These sets of compatible dependencies may be hosted on a networked resource, such as a content delivery network (CDN), and the location at which each set of compatible dependencies is hosted may be specified by a location identifier, such as a uniform resource locator (URL). According to exemplary embodiments of the present disclosure, obtaining the various dependencies, formatting the dependencies into a format such as ESM, generating sets of dependencies based on version compatibilities, and hosting the sets of dependencies to a network resource may be periodically performed so as to capture new versions of the dependencies that may be released.

After the various sets of compatible dependencies are uploaded to the networked resource, the hosted sets of compatible dependencies may be used and/or accessed by micro-frontend bundles forming a frontend application to eliminate duplication of loading multiple instances of the dependencies. For example, the micro-frontend bundles can natively import the dependencies from the network location where the dependencies are hosted, so that the dependencies can be obtained once and shared between the various micro-frontend bundles. According to exemplary embodiments of the present disclosure, a plugin may be provided that may be configured to parse the micro-frontend bundles (e.g., package information, the code base, a manifest, etc.) at build-time to determine the relevant set of dependencies to be accessed and replace the import calls to the dependencies with calls to the location identifier of the relevant sets of dependencies, so as to prevent each micro-frontend from individually loading a respective instance of the shared dependencies.

Advantageously, exemplary embodiments of the present disclosure can facilitate hosting and accessing dependencies on a networked resource, so that the dependencies that are shared among multiple micro-frontend bundles can be natively imported once and shared by multiple micro-frontend bundles, such that the shared dependences do not need to be bundled with each micro-frontend bundle. Accordingly, this deduplication of shared dependencies can improve latency and the user experience. For example, the micro-frontend bundles are smaller, as the shared dependencies will no longer be individually bundled with each micro-frontend. Additionally, duplicative code may be reduced, bundling micro-frontend bundles may be performed faster (e.g., bundlers can exclude dependency code, etc.), the shared dependencies may only be downloaded once and reused across multiple micro-frontend bundles, thereby reducing latency, and caching the shared dependencies may further improve latency. Further, although the exemplary embodiments of the present disclosure are described primarily with respect to deduplicating shared libraries in connection with micro-frontend bundles, aspects of the present disclosure may be applicable to various other implementations, such as other frontend applications, mobile applications, other shared dependency applications, and the like.

FIG. 1 is an illustration of an exemplary computing environment 100, according to exemplary embodiments of the present disclosure.

As shown in FIG. 1, computing environment 100 may include one or more client devices 110, also referred to as user devices, configured to connect over network 150 to communicate with computing resources 120 and/or content delivery network (CDN) 140 to access online applications, such as frontend applications employing a micro-frontend architecture, that may be executed and/or implemented on one or more computing resources 120. Further, computing resources 120 may access, via network 150, one or more package registry 130, which may be configured to host and/or maintain packages for a programming language and/or programming environment (e.g., such as JavaScript, etc.). In the illustrated implementation, client device 110 may include any type of computing devices, such as a smartphone, tablet, laptop computer, desktop computer, wearable, etc., and network 150 may include one or more wired or wireless network(s) (e.g., the Internet, cellular, satellite, Bluetooth, Wi-Fi, intranet, etc.) or any portion thereof, that can facilitate communications between client devices 110, computing resources 120, package registry 130, and/or CDN 140.

As illustrated, computing resources 120 may be representative of computing resources that may form a portion (e.g., a server, an edge server, etc.) of a larger networked computing platform (e.g., a content delivery network, a cloud computing platform, and the like) in provisioning applications employing a micro-frontend architecture to client devices 110. In provisioning of such applications, computing resources 120 may communicate with and/or form part of a CDN 140 and one or more datastores and/or databases that may be configured to store and/or maintain micro-frontend bundles and/or location identifiers associated with sets of compatible dependencies, such as libraries, of the micro-frontend bundles. According to exemplary implementations of the present disclosure, composition of micro-frontend bundles that compose the micro-frontend applications provisioned by computing resources 120 may be performed on the server-side (e.g., at computing resources 120), on the client-side (e.g., at client device 110, etc.), and the like.

According to exemplary embodiments of the present disclosure, computing resources 120 may provide various services and/or resources and do not require end-user knowledge of the physical premises and configuration of the system that delivers the services. For example, computing resources 120 may include or form a portion of "on-demand computing platforms," "software as a service (Saas)," "infrastructure as a service (IaaS)," "platform as a service (PaaS)," "platform computing," "network-accessible platforms," "data centers," "virtual computing platforms," and so forth. As shown in FIG. 1, computing resources 120 may include one or more processors 122 and one or more memory 124 (or other storage components). Further, micro-frontend service 125 may be stored in memory 124 and may be configured to be executed by one or more processor 122 of remote computing resources 120. Micro-frontend service 125 may be configured to perform certain actions and/or processes in the provisioning of an application employing a micro-frontend architecture to client device 110. Further, although FIG. 1 illustrates micro-frontend service 125 residing on computing resources 120, certain aspects of the present disclosure may be performed and/or executed on client device 110, computing resources 120, other computing resources, and/or any combination thereof. Example components of a computing resource implementing computing resources 120 are discussed below with respect to FIG. 9.

As illustrated in FIG. 1, one or more of client devices 110 may access computing resources 120, via network 150, to access one or more applications employing a micro-frontend architecture, such as a web application hosted on computing resources 120. For example, one or more client devices 110 may launch and/or execute an application, such as a browser, to access and/or execute a frontend application hosted on computing resources 120, such as a webpage, web-based application, and the like.

In exemplary implementations, micro-frontend service 125 executing on computing resources 120 may provision applications employing a micro-frontend architecture, which may include multiple micro-frontend bundles, that include one or more dependencies on libraries and/or other files. Exemplary embodiments of the present disclosure can facilitate deduplication of shared dependencies of libraries and the like that are common to more than one of the micro-frontend bundles that implement the micro-frontend application. In exemplary implementations, the libraries on which the micro-frontend bundles depend can be obtained from package registry 130, which may include a node packaging manager (e.g., npm, etc.). The libraries may be converted to a format that is compatible with the deduplication techniques implemented according to exemplary embodiments of the present disclosure. For example, in exemplary implementations where the libraries may be stored in a content delivery network (CDN), such as CDN 140, the libraries may be converted to a module format, such as the ECMAScript module (ESM) format.

In addition to converting the libraries to a compatible format, each library, and its corresponding dependencies, may also be processed and packaged into individual bundles. For example, certain libraries themselves may include further dependencies, i.e., transitive dependencies, peer dependencies, and the like, on other files. Accordingly, the bundling and packaging of each individual library may include the bundling and packaging of the library's transitive dependencies separately and individually. In view of such dependencies, each library may be processed to identify and recursively bundle and individually package each dependency within each library. For example, the dependencies of each library may first be determined. Based on the dependencies, it may further be determined whether the dependency should be individually and/or separately bundled. For example, if the dependency is not to be deduplicated, it would not be necessary to individually and/or separately bundle the dependency. Accordingly, after it is determined whether the dependency is to be individually and/or separately bundled, those dependencies that are to be deduplicated may be bundled individually and/or separately, such that the bundling and packaging of each library may result in multiple individually bundled packages corresponding to an individually bundled package for the library itself, as well as bundled packages for one or more dependencies. Further, the bundling may be performed to maintain multiple entry points that certain packages may include, as necessary.

The bundled and packaged libraries may be further processed to create compatible library sets. The compatible library sets may be created based on a dependency topology and the available and compatible versions of each library. According to exemplary embodiments of the present disclosure, the dependencies for each library may be determined and a dependency tree may be generated for each library according to a reverse dependency. In an exemplary implementation where Library A is dependent on Library B, and Library B is dependent on Library C, the dependency topology order (e.g., according to a reverse dependency implementation) would be Library C, Library B, and Library A. Using the dependency tree and the available and compatible versions of each library, compatible library sets may be created for the bundled and packaged libraries.

Continuing the example implementation where Library A is dependent on Library B, and Library B is dependent on Library C, the compatible versions of the dependencies may be determined in accordance with a reverse dependency order, so that the available and compatible dependencies is first determined for Library C, then Library B, and finally Library A. For example, it may be determined that versions 1.0, 2.0, and 3.0 are available for Library C. Accordingly, three groups may first be created for available versions of Library C, such that Group 1 includes Library C version 1.0, Group 2 includes Library C version 2.0, and Group 3 includes Library C version 3.0. It may then be determined that Library C version 1.0 is compatible with Library B version 1.0, Library C version 2.0 is compatible with Library B version 2.0, and Library C version 3.0 is compatible with Library B version 3.0 and Library B version 2.0. Accordingly, the compatible versions of Library B may be added to the groups and/or additional groups may be created such that Group 1 includes Library C version 1.0 and Library B version 1.0, Group 2 includes Library C version 2.0 and Library B version 2.0, and Group 3 includes Library C version 3.0 and Library B version 3.0. Further, additional Group 4 may be included, which may include Library C version 3.0 and Library B version 2.0. Finally, it may be determined that Library A version 1.0 is compatible with all versions of Libraries B and C, and Library A version 2.0 is compatible with all versions of Libraries B and C. Accordingly, the groups may be further modified so that: (1) Group 1 includes Library C version 1.0, Library B version 1.0, and Library A version 1.0: (2) Group 2 includes Library C version 2.0, Library B version 2.0, and Library A version 1.0: (3) Group 3 includes Library C version 3.0, Library B version 3.0, and Library A version 1.0; and (4) Group 4 includes Library C version 3.0, Library B version 2.0, and Library A version 1.0. Additional groups may also be created as follows: (1) Group 5, which may include Library C version 1.0, Library B version 1.0, and Library A version 2.0: (2) Group 6, which may include Library C version 2.0, Library B version 2.0, and Library A version 2.0: (3) Group 7, which may include Library C version 3.0, Library B version 3.0, and Library A version 2.0; and (4) Group 8, which may include Library C version 3.0, Library B version 2.0, and Library A version 2.0. Accordingly, each group can be considered to be a compatible library set.

According to exemplary embodiments of the present disclosure, each compatible library set may be uploaded and hosted by a networked computing resource at a network location specified by a location identifier (e.g., URL). As illustrated in FIG. 1, the compatible library sets may be uploaded to and hosted by CDN 140, and the location identifiers associated with each compatible library set may be stored and maintained by computing resources 120. Further, the compatible library sets may be continuously and periodically updated as new versions and/or changes in the compatibility of the various libraries are released.

Accordingly, the compatible library sets stored and/or hosted by CDN 140, along with the location identifiers stored and maintained by computing resources 120, may be utilized to deduplicate dependencies shared between multiple micro-frontend bundles of a micro-frontend application. According to exemplary embodiments of the present disclosure, the micro-frontend bundles (e.g., package information, the code base, a manifest, etc.) of a micro-frontend application being accessed by client device 110 may be parsed, and the imports of shared libraries of the micro-frontend bundles may be replaced with references to the location identifiers of the corresponding libraries hosted by CDN 140. For example, micro-frontend service 125 may also include a plug-in configured to parse the micro-frontend bundles and replace the calls to import the shared libraries with references to the location identifier specifying the location of the corresponding shared libraries.

In connection with replacing the calls to import the shared libraries with references to the location identifiers for the corresponding shared libraries, exemplary embodiments of the present disclosure also attempt to resolve the versions of the libraries that are called in the import statements with the versions of the libraries that are available on CDN 140. For example, compatible ranges of the shared libraries may be merged, and the closest available version of the library identified in the import statement that still satisfies the merged compatibility range of the library is identified, and the location identifier corresponding to the identified library may be provided. Optionally, a warning may be provided indicating that a different version of the library is being utilized.

Additionally, with the understanding that certain libraries may require that only a single version of a particular library may be utilized for an entire application, in merging the compatible ranges of the shared libraries, exemplary embodiments of the present disclosure may employ a version convergence technique in determining the versions of the shared library to be used when replacing the import statements with the location identifiers specifying the location of the corresponding library. In employing the version convergence technique, the compatible versions of each shared library within the application are determined, and priority may be given to a direct dependency (over a peer dependency). Version convergence is described in further detail herein in connection with at least FIG. 8. Accordingly, after the imports have been replaced with location identifiers specifying the networked location of the corresponding libraries, the micro-frontend bundles can natively import the libraries from the network locations specified by the location identifiers, so that the libraries can be obtained once and shared between the various micro-frontend bundles.

Figure 2:
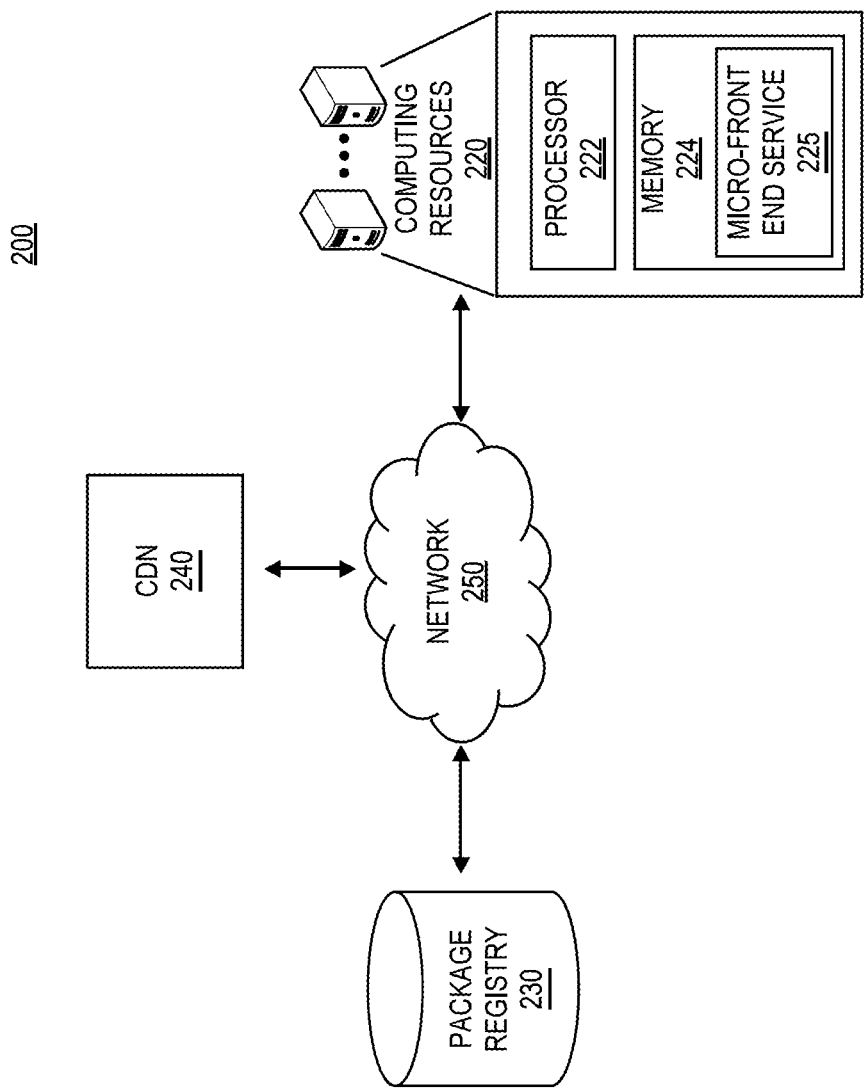
FIG. 2 is an illustration of an exemplary computing environment, according to exemplary embodiments of the present disclosure.

FIG. 2 is an illustration of an exemplary computing environment 200, according to exemplary embodiments of the present disclosure.

As shown in FIG. 2, computing environment 200 may include computing resources 220 configured to connect over network 250 to communicate with CDN 240 and/or one or more package registries 230, which may be configured to host and/or maintain a package manager for a programming language and/or programming environment (e.g., such as JavaScript, etc.). In the illustrated implementation, network 250 may include one or more wired or wireless network (e.g., the Internet, cellular, satellite, Bluetooth, Wi-Fi, intranet, etc.) that can facilitate communications between computing resources 220 and package registry 230.

As illustrated, computing resources 220 may be representative of computing resources that may form a portion (e.g., a server, an edge server, etc.) of a larger networked computing platform (e.g., a content delivery network, a cloud computing platform, and the like) and may provision applications employing a micro-frontend architecture to one or more client devices. In provisioning of such applications, computing resources 220 may communicate with and/or form part of a content delivery network (CDN) 240. According to exemplary implementations of the present disclosure, composition of micro-frontend bundles that compose the micro-frontend applications provisioned by computing resources 220 may be performed on the server-side (e.g., at computing resources 220), on the client-side, and the like.

According to exemplary embodiments of the present disclosure, computing resources 220 may provide various services and/or resources and do not require end-user knowledge of the physical premises and configuration of the system that delivers the services. For example, computing resources 220 may include or form a portion of "on-demand computing platforms," "software as a service (Saas)," "infrastructure as a service (IaaS)," "platform as a service (PaaS)," "platform computing," "network-accessible platforms," "data centers," "virtual computing platforms," and so forth. As shown in FIG. 2, computing resources 220 may include one or more processors 222 and one or more memory 224 (or other storage components). Further, micro-frontend service 225 may be stored in memory 224 and may be configured to be executed by one or more processor 222 of remote computing resources 220. Micro-frontend service 225 may be configured to perform certain actions and/or processes in the provisioning of an application employing a micro-frontend architecture to client devices. Further, although FIG. 2 illustrates micro-frontend service 225 residing on computing resources 220, certain aspects of the present disclosure may be performed and/or executed on the client devices accessing the micro-frontend applications, computing resources 220, other computing resources, and/or any combination thereof.

As illustrated in FIG. 2, one or more of client devices may access computing resources 220, to access one or more applications employing a micro-frontend architecture, such as a web application hosted on computing resources 220. For example, the one or more client devices may launch and/or execute an application, such as a browser, to access and/or execute a frontend application hosted on computing resources 220, such as a webpage, web-based application, and the like.

In exemplary implementations, micro-frontend service 225 executing on computing resources 220 may provision applications employing a micro-frontend architecture, which may include multiple micro-frontend bundles, that include one or more dependencies on libraries and/or other files. Exemplary embodiments of the present disclosure can facilitate deduplication of shared dependencies on libraries and the like that are common to more than one of the micro-frontend bundles that implement the micro-frontend application. In exemplary implementations, the libraries on which the micro-frontend bundles depend can be obtained from package registry 230, which may include a node packaging manager (e.g., npm, etc.). The libraries may be converted to a format that is compatible with the deduplication techniques implemented according to exemplary embodiments of the present disclosure. For example, in exemplary implementations where the libraries may be stored in a content delivery network (CDN), such as CDN 240, the libraries may be converted to a module format, such as the ECMAScript module (ESM) format.

In addition to converting the libraries to a compatible format, each library and its corresponding dependencies may also be processed and packaged into individual bundles. For example, certain libraries themselves may include further dependencies, i.e., direct dependencies, transitive dependencies, peer dependencies, and the like, on other files. Accordingly, the bundling and packaging of each individual library may include the bundling and packaging of the dependencies upon which each library may depend. In view of such peer dependencies, each library may be processed to identify and recursively bundle and individually package each dependency within each library. For example, the dependencies of each library may first be determined. Based on the dependencies, it may further be determined whether the dependency should be individually and/or separately bundled. For example, if the dependency is not to be deduplicated, it would not be necessary to individually and/or separately bundle the dependency. Accordingly, after it is determined whether the dependency is to be individually and/or separately bundled, those dependencies that are to be deduplicated may be bundled individually and/or separately, such that the bundling and packaging of each library may result in multiple individually bundled packages corresponding to an individually bundled package for the library itself, as well as bundled packages for one or more files on which the library may be dependent. Further, the bundling may be performed to maintain multiple entry points that certain packages may include, as necessary.

The bundled and packaged libraries may be further processed to create compatible library sets. The compatible library sets may be created based on a dependency topology and the available and compatible versions of each library. According to exemplary embodiments of the present disclosure, the dependencies for each library may be determined and a dependency tree may be generated for each library according to a reverse dependency order. In an exemplary implementation where Library A is dependent on Library B, and Library B is dependent on Library C, the dependency topology order (e.g., according to a reverse dependency implementation) would be Library C, Library B, and Library A. Using the dependency tree and the available and compatible versions of each library, compatible library sets may be created for the bundled and packaged libraries.

Continuing the example implementation where Library A is dependent on Library B, and Library B is dependent on Library C, the compatible versions of the dependencies may be determined in accordance with a reverse dependency order, so that the available and compatible dependencies is first determined for Library C, then Library B, and finally Library A. For example, it may be determined that versions 1.0, 2.0, and 3.0 are available for Library C. Accordingly, three groups may first be created for available versions of Library C, such that Group 1 includes Library C version 1.0, Group 2 includes Library C version 2.0, and Group 3 includes Library C version 3.0. It may then be determined that Library C version 1.0 is compatible with Library B version 1.0, Library C version 2.0 is compatible with Library B version 2.0, and Library C version 3.0 is compatible with Library B version 3.0 and Library B version 2.0. Accordingly, the compatible versions of Library B may be added to the groups and/or additional groups may be created such that Group 1 includes Library C version 1.0 and Library B version 1.0, Group 2 includes Library C version 2.0 and Library B version 2.0, and Group 3 includes Library C version 3.0 and Library B version 3.0. Further, additional Group 4 may be included, which may include Library C version 3.0 and Library B version 2.0. Finally, it may be determined that Library A version 1.0 is compatible with all versions of Libraries B and C, and Library A version 2.0 is compatible with all versions of Libraries B and C. Accordingly, the groups may be further modified so that: (1) Group 1 includes Library C version 1.0, Library B version 1.0, and Library A version 1.0: (2) Group 2 includes Library C version 2.0, Library B version 2.0, and Library A version 1.0: (3) Group 3 includes Library C version 3.0, Library B version 3.0, and Library A version 1.0; and (4) Group 4 includes Library C version 3.0, Library B version 2.0, and Library A version 1.0. Additional groups may also be created as follows: (1) Group 5, which may include Library C version 1.0, Library B version 1.0, and Library A version 2.0: (2) Group 6, which may include Library C version 2.0, Library B version 2.0, and Library A version 2.0: (3) Group 7, which may include Library C version 3.0, Library B version 3.0, and Library A version 2.0; and (4) Group 8, which may include Library C version 3.0, Library B version 2.0, and Library A version 2.0. Accordingly, each group can be considered to be a compatible library set.

According to exemplary embodiments of the present disclosure, each compatible library set may be uploaded and hosted by a networked computing resource at a network location specified by a location identifier (e.g., URL). As illustrated in FIG. 2, the compatible library sets may be uploaded to and hosted by CDN 240, and the location identifiers associated with each compatible library set may be stored and maintained by computing resources 220. Further, the compatible library sets may be continuously and periodically updated as new versions and/or changes in the compatibility of the various libraries are released. Accordingly, the compatible library sets stored and/or hosted by CDN 240, along with the location identifiers stored and maintained by computing resources 220 may be utilized (e.g., by micro-frontend services 225) to deduplicate dependencies shared between micro-frontend bundles of a micro-frontend application in integrating and/or composing the micro-frontend bundles into a micro-frontend application.

Figure 3:
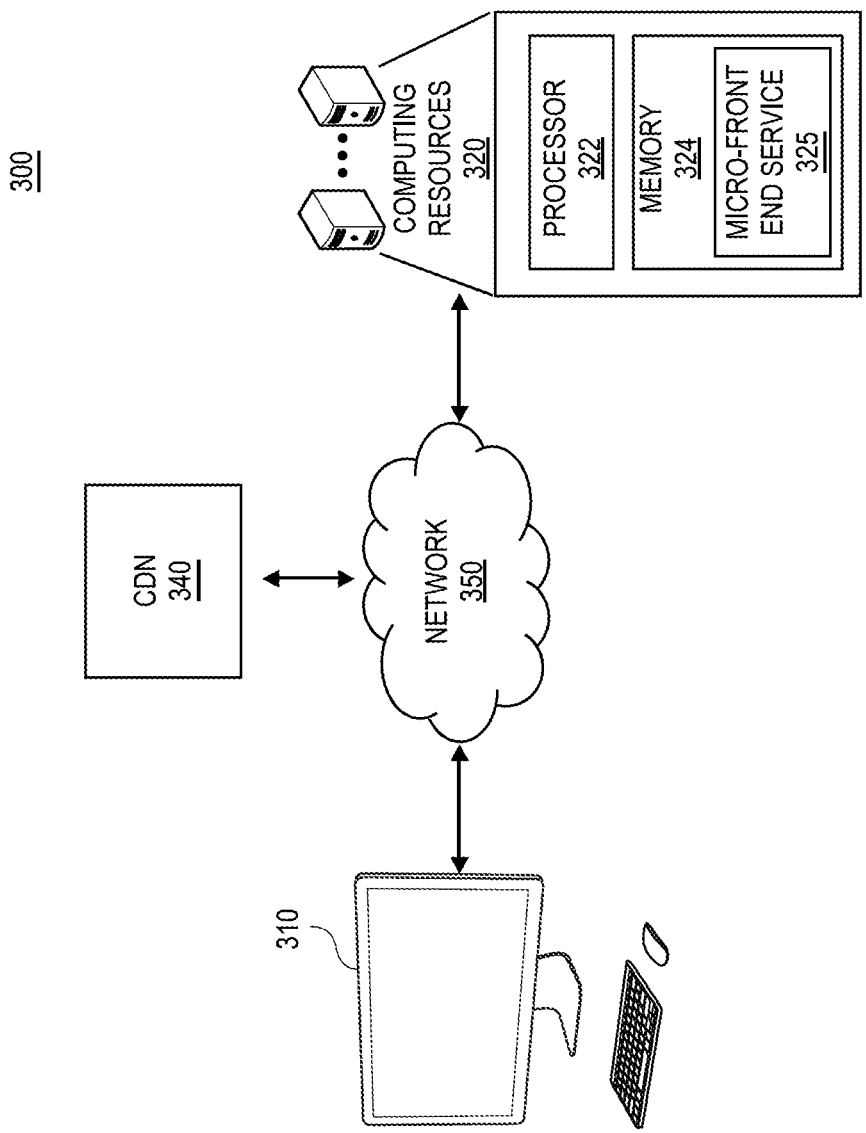
FIG. 3 is an illustration of an exemplary computing environment, according to exemplary embodiments of the present disclosure.

FIG. 3 is an illustration of an exemplary computing environment 300, according to exemplary embodiments of the present disclosure.

As shown in FIG. 3, computing environment 300 may include one or more client devices 310, also referred to as user devices, configured to connect over network 350 to access online applications, such as frontend applications employing a micro-frontend architecture, that may be executed and/or implemented on one or more computing resources 320. In the illustrated implementation, client device 310 may include any type of computing devices, such as a smartphone, tablet, laptop computer, desktop computer, wearable, etc., and network 350 may include any wired or wireless network (e.g., the Internet, cellular, satellite, Bluetooth, Wi-Fi, etc.) that can facilitate communications between client devices 310 and computing resources 320.

As illustrated, computing resources 320 may be representative of computing resources that may form a portion (e.g., a server, an edge server, etc.) of a larger networked computing platform (e.g., a content delivery network, a cloud computing platform, and the like) in provisioning applications employing a micro-frontend architecture to client devices 310. In provisioning of such applications, computing resources 320 may communicate with and/or form part of a content delivery network (CDN) 340, that may be configured to store and/or maintain micro-frontend bundles and/or location identifiers associated with shared dependencies, such as libraries, of the micro-frontend bundles. According to exemplary implementations of the present disclosure, composition of micro-frontend bundles that compose the micro-frontend applications provisioned by computing resources 320 may be performed on the server-side (e.g., at computing resources 320), on the client-side (e.g., at client device 310, etc.), and the like.

According to exemplary embodiments of the present disclosure, computing resources 320 may provide various services and/or resources and do not require end-user knowledge of the physical premises and configuration of the system that delivers the services. For example, computing resources 320 may include or form a portion of "on-demand computing platforms." "software as a service (Saas)," "infrastructure as a service (IaaS)," "platform as a service (PaaS)," "platform computing." "network-accessible platforms," "data centers," "virtual computing platforms," and so forth. As shown in FIG. 3, computing resources 320 may include one or more processors 322 and one or more memory 324 (or other storage components). Further, micro-frontend service 325 may be stored in memory 324 and may be configured to be executed by one or more processor 322 of remote computing resources 320. Micro-frontend service 325 may be configured to perform certain actions and/or processes in the provisioning of an application employing a micro-frontend architecture to client device 310. Further, although FIG. 3 illustrates micro-frontend service 325 residing on computing resources 320, certain aspects of the present disclosure may be performed and/or executed on client device 310, computing resources 320, other computing resources, and/or any combination thereof. Example components of a computing resource implementing computing resources 320 are discussed below with respect to FIG. 9.

As illustrated in FIG. 3, one or more of client devices 310 may access computing resources 320, via network 350, to access one or more applications employing a micro-frontend architecture, such as a web application hosted on computing resources 320. For example, one or more client devices 310 may launch and/or execute an application, such as a browser, to access and/or execute a frontend application hosted on computing resources 320, such as a webpage, web-based application, and the like.

In exemplary implementations, micro-frontend service 325 executing on computing resources 320 may provision applications employing a micro-frontend architecture, which may include multiple micro-frontend bundles, that include one or more dependencies on libraries and/or other files. Exemplary embodiments of the present disclosure can facilitate deduplication of shared dependencies on libraries and the like that are common to more than one of the micro-frontend bundles that implement the micro-frontend application. In exemplary implementations, the libraries on which the micro-frontend bundles depend can be obtained from a package registry/manager. The libraries may be converted to a format that is compatible with the deduplication techniques implemented according to exemplary embodiments of the present disclosure. For example, in exemplary implementations where the libraries may be stored in a content delivery network (CDN), such as CDN 340, the libraries may be converted to a module format, such as the ECMAScript module (ESM) format.

According to exemplary embodiments of the present disclosure, each compatible library set may be uploaded and hosted by a networked computing resource at a network location specified by a location identifier (e.g., URL). As illustrated in FIG. 3, the compatible library sets may be hosted by CDN 340, and the location identifiers associated with each compatible library set may be stored and maintained by computing resources 320. Further, the groups may be continuously and periodically updated as new versions and/or changes in the compatibility of the various libraries are released.

Accordingly, the compatible library sets stored and/or hosted by CDN 340, along with the location identifiers stored and maintained by computing resources 320, may be utilized to deduplicate dependencies shared between multiple micro-frontend bundles of a micro-frontend application. According to exemplary embodiments of the present disclosure, the micro-frontend bundles (e.g., package information, the code base, a manifest, etc.) of a micro-frontend application being accessed by client device 310 may be parsed, and the imports of shared libraries of the micro-frontend bundles may be replaced with references to the location identifiers of the corresponding libraries hosted by CDN 340. For example, micro-frontend service 325 may include a plug-in configured to parse the micro-frontend bundles (e.g., package information, the code base, a manifest, etc.) and replace the calls to import the shared libraries with references to the location identifier specifying the location of the corresponding shared libraries.

In connection with replacing the calls to import the shared libraries with references to the location identifiers for the corresponding shared libraries, exemplary embodiments of the present disclosure also attempt to resolve the versions of the libraries that are called in the import statements with the versions of the libraries that are available (e.g., from the compatible library sets) from CDN 340. For example, compatible ranges of the shared libraries may be merged, and the closest available version of the library identified in the import statement that still satisfies the merged compatibility range of the library is identified, and the location identifier corresponding to the identified library may be provided. Optionally, a warning may be provided indicating that a different version of the library is being utilized.

Additionally, with the understanding that certain libraries may require that only a single version of a particular library may be utilized for an entire application, in merging the compatible ranges of the shared libraries, exemplary embodiments of the present disclosure may employ a version convergence technique in determining the versions of the shared library to be used when replacing the import statements with the location identifiers specifying the location of the corresponding library. In employing the version convergence technique, the compatible versions of each shared library within the application are determined, and priority may be given to a direct dependency (over a peer dependency). Version convergence is described in further detail herein in connection with at least FIG. 8. Accordingly, after the imports have been replaced with location identifiers specifying the networked location of the corresponding libraries, the micro-frontend bundles can natively import the libraries from the network locations specified by the location identifiers, so that the libraries can be obtained once and shared between the various micro-frontend bundles.

Figure 4:
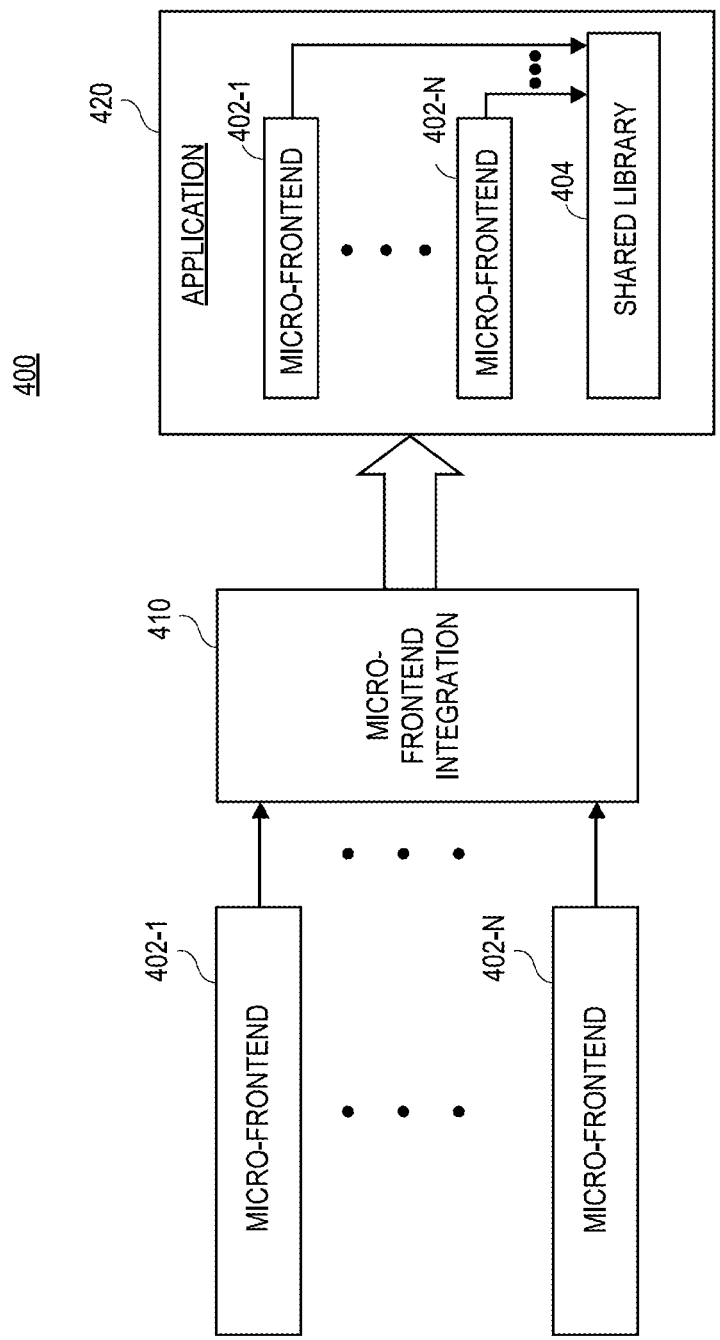
FIG. 4 is a block diagram of an exemplary integration of an exemplary micro-frontend application, according to exemplary embodiments of the present disclosure.

FIG. 4 is a block diagram of an exemplary integration 400 of an exemplary micro-frontend application 420, according to exemplary embodiments of the present disclosure.

As shown in FIG. 4, integration 400 of micro-frontend application 420 may include integrating and/or otherwise composing multiple micro-frontends 402 that make up integration 400 into micro-frontend application 420. In the illustrated implementation, micro-frontend application 420 may be made up of micro-frontends 402 (e.g., micro-frontends 402-1 through 402-N). Each micro-frontend 402 may correspond to a fragment and/or feature of micro-frontend application 420 and may include its own independent framework, codebase, build configuration, and the like. Accordingly, each micro-frontend 402 may have been developed by an independent, autonomous team.

In connection with the integration and/or composing of micro-frontends 402 into micro-frontend application 420, exemplary embodiments of the present disclosure can facilitate deduplication of shared dependencies, such as shared libraries, so that the shared libraries are not individually bundled with each micro-frontend 402 that depends on the shared dependency. According to exemplary embodiments of the present disclosure, the shared dependencies of micro-frontends 402 may be accessed and retrieved from a CDN (e.g., CDN 140, 240, or 340, etc.) and shared between micro-frontends 402. As shown in FIG. 4, shared library 404 may have been obtained from a CDN and shared between micro-frontends 402-1 through 402-N. According to exemplary embodiments of the present disclosure, integration of the micro-frontends may be performed at build-time, run-time, and the like.

In exemplary implementations of the present disclosure, shared library 404 may have been obtained from a networked computing resource, such as a package registry/manager. Shared library 404 may then have been processed to convert shared library 404 to a compatible format, such as an ESM format, and bundled into an individual packages. The bundling of shared library 404 may have included identifying dependencies of shared library 404, determining if any of the dependencies are to be individually bundled, and recursively bundling each such dependency into its own individual package. After bundling shared library 404 (and any of its dependencies), version compatibilities of library 404 may have been determined, and compatible library sets may have been generated, which may have then been uploaded to the CDN. Further, location identifiers (e.g., URLs, etc.) specifying the network location of the compatible library sets may also have been stored and maintained, so that the compatible library sets may be accessed.

The compatible library sets stored and/or maintained by the CDN may be utilized by micro-frontend integration 410 in integrating and/or composing micro-frontends 402 into micro-frontend application 420. For example, a plug-in may be utilized to replace imports of shared library 404 in micro-frontends 402 with the location identifiers indicating the network location of shared library 404, so that shared library 404 may be natively obtained once and shared between micro-frontends 402. Further, replacement of the import statements of shared library 404 in micro-frontends 402 may also include determining the proper versions of shared library 404 from the available versions of shared library 404 (e.g., from the compatible library sets), so that the appropriate compatible library set of shared library 404 may be identified and the location identifier used to replace the import statements includes the location identifier specifying the location of the appropriate version and/or compatible library set of shared library 404. Accordingly, as shown in FIG. 4, micro-frontends 402 can share shared library 404, that was natively imported from a CDN, so that shared library 404 need not be individually bundled with each of micro-frontends 402.

Figure 5:
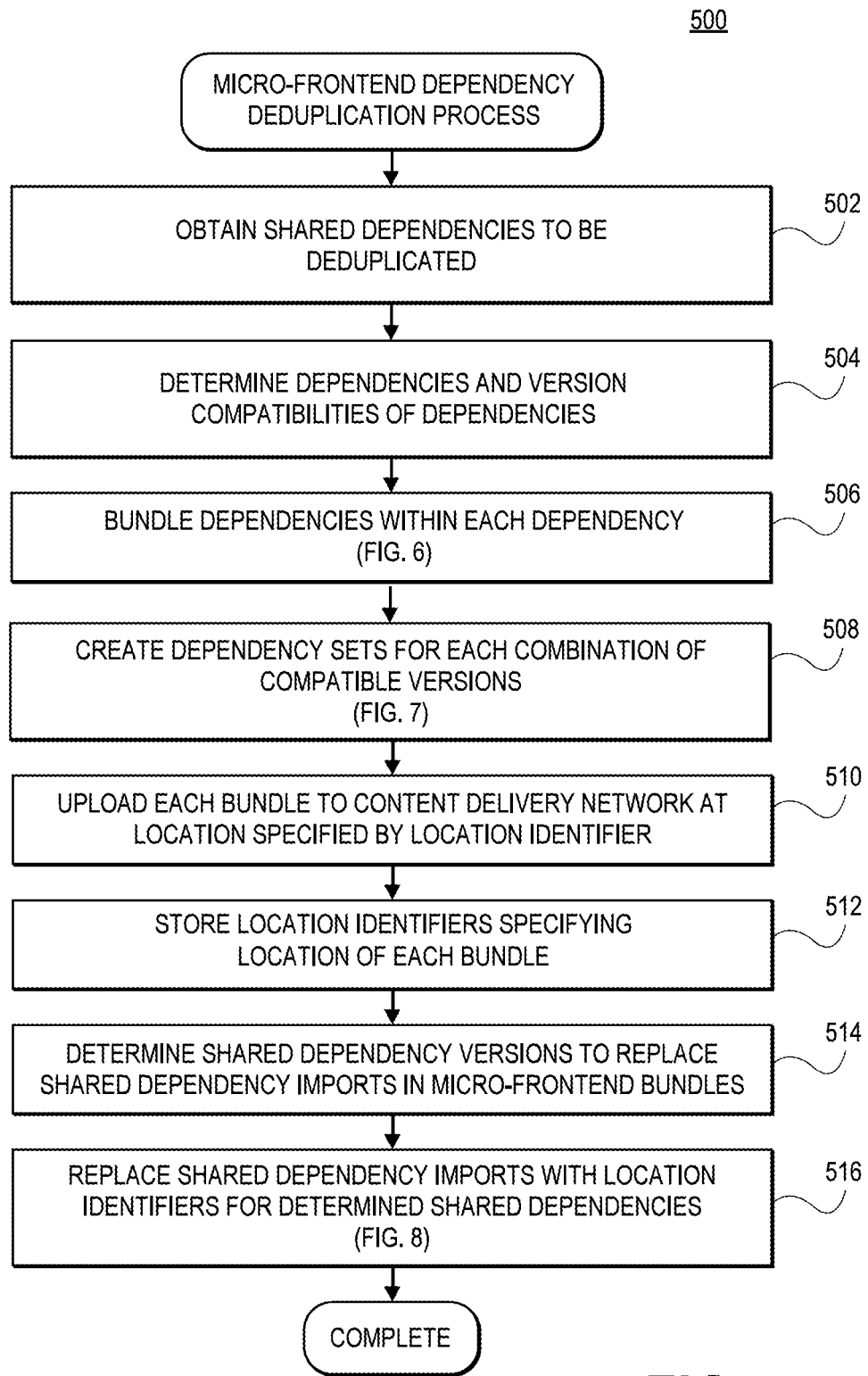
FIG. 5 is a flow diagram of an exemplary micro-frontend dependency deduplication process, according to exemplary embodiments of the present disclosure.

FIG. 5 is a flow diagram of an exemplary micro-frontend dependency deduplication process 500, according to exemplary embodiments of the present disclosure.

As shown in FIG. 5, exemplary micro-frontend dependency deduplication process 500 may begin with obtaining the dependencies/libraries of micro-frontends that are to be deduplicated, as in step 502. According to exemplary embodiments of the present disclosure, the dependencies/libraries on which the micro-frontend bundles depend can be obtained from, for example, a package registry/manager.

In step 504, the dependencies, such as libraries, and the version compatibilities of the dependencies may be determined. Subsequently, in step 506, the dependencies within each dependency may be bundled, and, in step 508, dependency sets for the bundles of dependencies/libraries may be created for each combination of compatible versions. Bundling and/or creation of the dependency sets for the dependencies/libraries in preparation for hosting by the networked computing resource, such as a CDN, may include, for example, converting the dependencies/libraries to a module format, such as the ECMAScript module (ESM) format. Additionally, each dependency/library may also be processed and packaged into individual bundles. For example, the corresponding dependencies of each library may be identified, and it may be determined whether each corresponding dependency should be bundled separately/individually. Accordingly, if it is determined that the dependency should be bundled separately/individually, each such corresponding dependency may be recursively bundled into its own individual package. Accordingly, the bundling and packaging of each dependency/library may result in multiple individually bundled packages corresponding to an individually bundled package for the dependency/library itself, as well as bundled packages for each dependency on which the dependency/library may depend.

After bundling of the libraries, version compatibilities of the dependencies/libraries may also be determined, and compatible dependency/library sets may be created for each combination of compatible versions. According to exemplary embodiments of the present disclosure, a dependency tree may be generated for each dependency/library according to a reverse dependency. Using the dependency tree and the available and compatible versions of each dependency/library, compatible dependency/library sets may be created for the bundled and packaged dependencies/libraries. In step 510, the compatible dependency/library sets may be uploaded to a CDN, and, in step 512, location identifiers associated with the compatible dependency/library sets specifying the network location of the compatible dependency/library sets may be stored and maintained in a datastore.

In step 514, the shared dependency versions to replace the shared dependency imports in the micro-frontend bundles may be determined. This may include, for example, parsing the micro-frontends (e.g., package information, the code base, a manifest, etc.) to identify shared dependency imports, as well as the versions of the dependencies/libraries available that are hosted by the CDN. For example, compatible ranges of the shared libraries may be merged, and the closest available version of the library identified in the import statement that still satisfies the merged compatibility range of the library is identified.

In step 516, the identified dependency/library imports may be replaced with location identifiers associated with the shared dependencies/libraries determined in step 512. Accordingly, the shared dependencies/libraries may be natively imported from the CDN, so that the shared dependencies/libraries need not be individually bundled with each of the micro-frontends.

Figure 6:
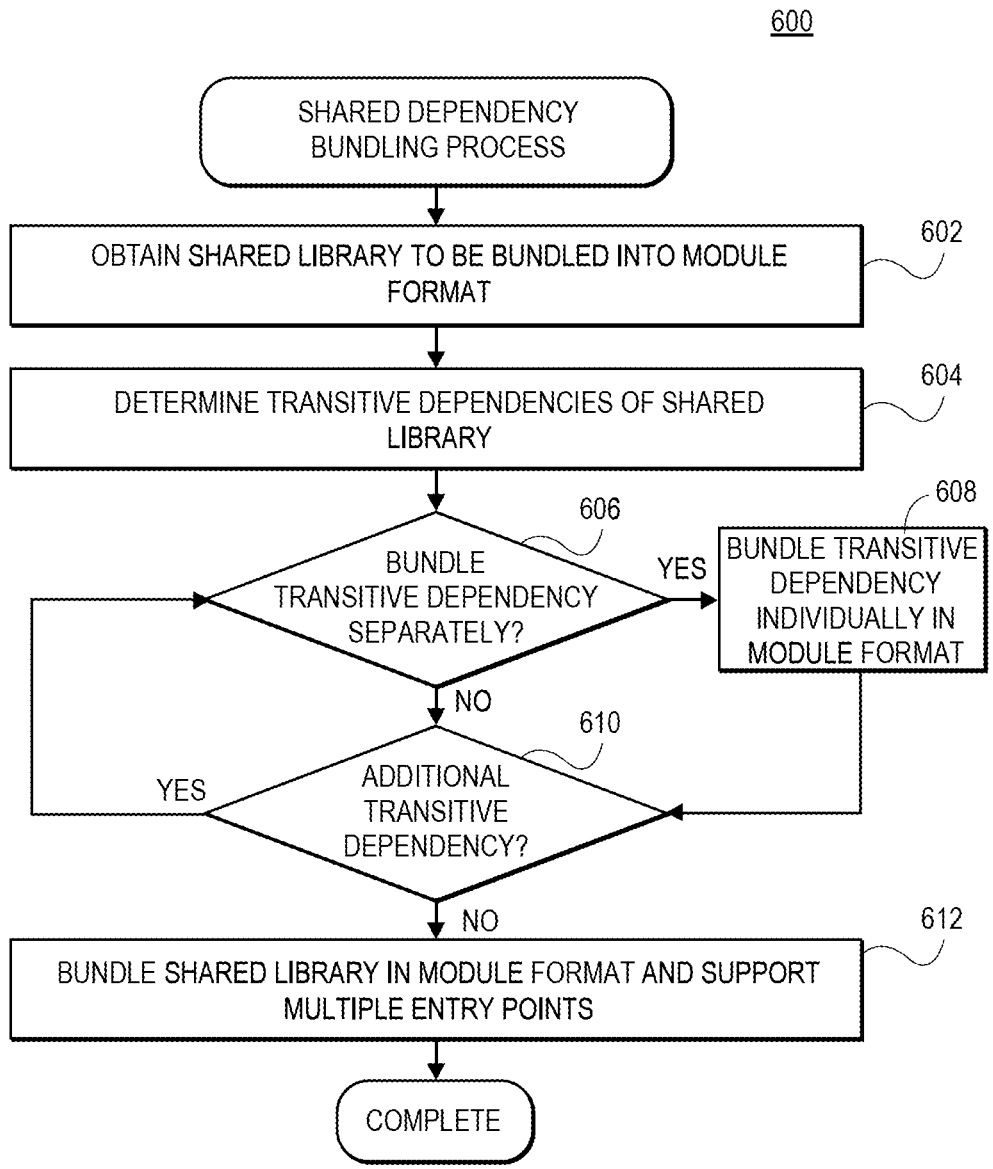
FIG. 6 is a flow diagram of an exemplary shared dependency bundling process, according to exemplary embodiments of the present disclosure.

FIG. 6 is a flow diagram of an exemplary shared dependency bundling process 600, according to exemplary embodiments of the present disclosure.

As shown in FIG. 6, exemplary shared dependency bundling process 600 may begin with obtaining the shared library and/or dependency to be bundled into a module format (e.g., ECMAScript module format, etc.) to facilitate deduplication of the shared library and/or dependency, as in step 602. According to exemplary embodiments of the present disclosure, the dependencies/libraries on which the micro-frontend bundles depend can be obtained from, for example, a package registry/manager.

In step 604, the transitive dependencies of the shared library/dependency can be determined. After the transitive dependencies have been determined, in step 606, it may be determined whether the transitive dependency should be bundled separately. For example, in exemplary embodiments where the transitive dependency is not to be deduplicated (e.g., it is not used by other micro-frontends, etc.), it may be determined that the transitive dependency is not to be bundled separately.

If it is determined that the transitive dependencies should be bundled separately, in step 608, the transitive dependency is individually bunded in a module format (e.g., ECMAScript, etc.). For example, in exemplary implementations where the dependencies/libraries may be stored in a CDN, the dependencies/libraries may be converted to a module format, such as the ESM format. In step 610, it can be determined if additional transitive dependencies exist, so that in the event that additional transitive dependencies exist, process 600 can return to step 606 to determine whether to continue recursively bundling each transitive dependency separately.

After all transitive dependencies have been addressed, in step 612, the shared dependency/library itself is bundled and/or packaged into its own individual bundle and/or package in a module format and multiple entry points may be supported for the library. For example, certain packages may include multiple entry points of a (e.g., feature exports), and the library may be bundled and/or packaged to maintain the multiple entry points. Afterwards, process 600 completes.

Figure 7:
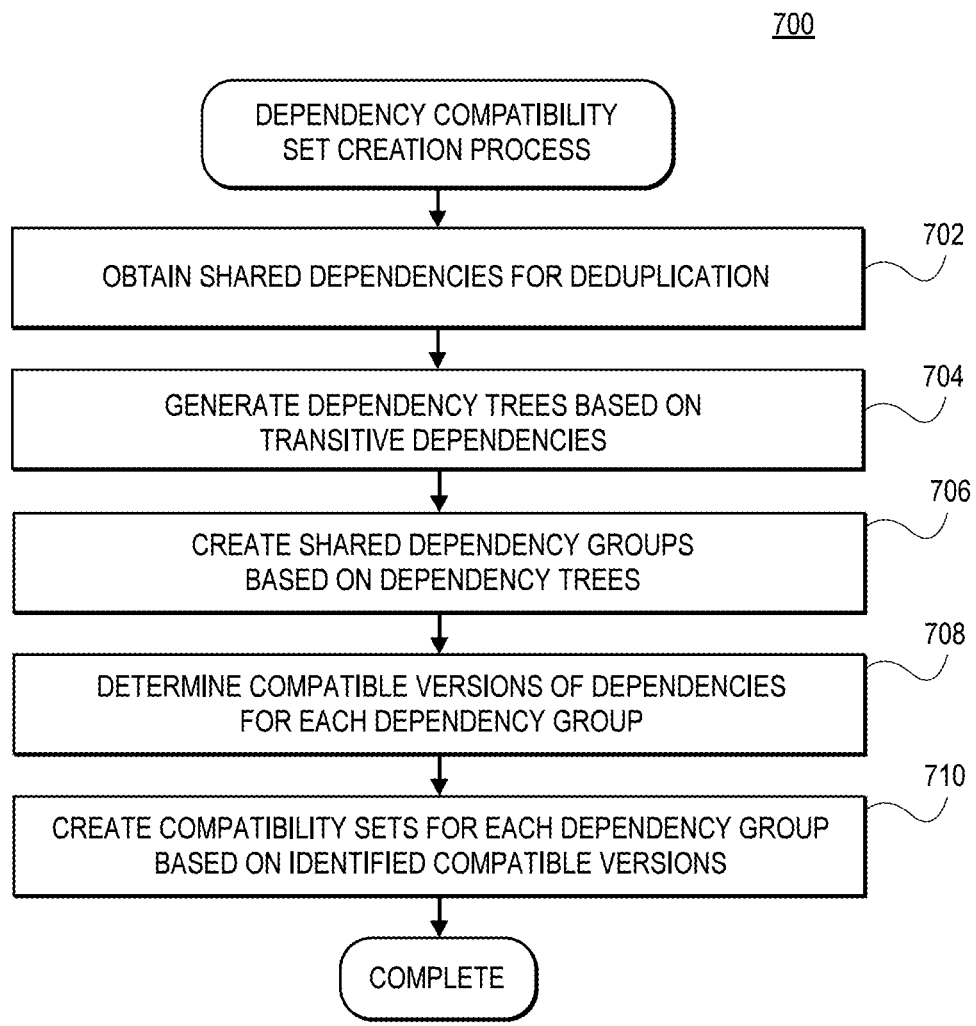
FIG. 7 is a flow diagram of an exemplary dependency compatibility set creation process, according to exemplary embodiments of the present disclosure.

FIG. 7 is a flow diagram of an exemplary dependency compatibility set creation process 700, according to exemplary embodiments of the present disclosure.

As shown in FIG. 7, exemplary dependency compatibility set creation process 700 may begin with obtaining the shared dependencies/libraries of micro-frontends that are to be deduplicated, as in step 702. According to exemplary embodiments of the present disclosure, the dependencies/libraries on which the micro-frontend bundles depend can be obtained from, for example, a package registry/manager.

To create the compatibility sets, in step 704, dependency trees may be generated based on the transitive dependencies of the shared dependencies that are to be deduplicated. For example, a dependency tree may be generated for each library according to a reverse dependency order. In an exemplary implementation where Library A is dependent on Library B, and Library B is dependent on Library C, the dependency topology order (e.g., according to a reverse dependency implementation) would be Library C, Library B, and Library A. Dependency groups may then be created based on the dependency trees, as in step 706. Continuing the above example, Library C, Library B, and Library A may form a dependency group.

In step 708, compatible versions of each dependency/library for each dependency group may be determined. Continuing the example implementation where Library A is dependent on Library B, and Library B is dependent on Library C, the compatible versions of the dependencies may be determined in accordance with the reverse dependency topology order, so that the available and compatible dependencies is first determined for Library C, then Library B, and finally Library A. For example, it may be determined that versions 1.0, 2.0, and 3.0 are available for Library C.

In step 710, compatibility sets may be created for each dependency group based on the identified compatible versions. Continuing the above example, three groups may first be created for available versions of Library C, such that Group 1 includes Library C version 1.0, Group 2 includes Library C version 2.0, and Group 3 includes Library C version 3.0. It may then be determined that Library C version 1.0 is compatible with Library B version 1.0, Library C version 2.0 is compatible with Library B version 2.0, and Library C version 3.0 is compatible with Library B version 3.0 and Library B version 2.0. Accordingly, the compatible versions of Library B may be added to the groups and/or additional groups may be created such that Group 1 includes Library C version 1.0 and Library B version 1.0, Group 2 includes Library C version 2.0 and Library B version 2.0, and Group 3 includes Library C version 3.0 and Library B version 3.0. Further, additional Group 4 may be included, which may include Library C version 3.0 and Library B version 2.0. Finally, it may be determined that Library A version 1.0 is compatible with all versions of Libraries B and C, and Library A version 2.0 is compatible with all versions of Libraries B and C. Accordingly, the groups may be further modified so that: (1) Group 1 includes Library C version 1.0, Library B version 1.0, and Library A version 1.0: (2) Group 2 includes Library C version 2.0, Library B version 2.0, and Library A version 1.0: (3) Group 3 includes Library C version 3.0, Library B version 3.0, and Library A version 1.0; and (4) Group 4 includes Library C version 3.0, Library B version 2.0, and Library A version 1.0. Additions groups may also be created as follows: (1) Group 5, which may include Library C version 1.0, Library B version 1.0, and Library A version 2.0: (2) Group 6, which may include Library C version 2.0, Library B version 2.0, and Library A version 2.0: (3) Group 7, which may include Library C version 3.0, Library B version 3.0, and Library A version 2.0; and (4) Group 8, which may include Library C version 3.0, Library B version 2.0, and Library A version 2.0. Accordingly, each group can be considered to be a compatibility set that may be stored in a CDN to facilitate deduplication of shared dependencies/libraries.

Figure 8:
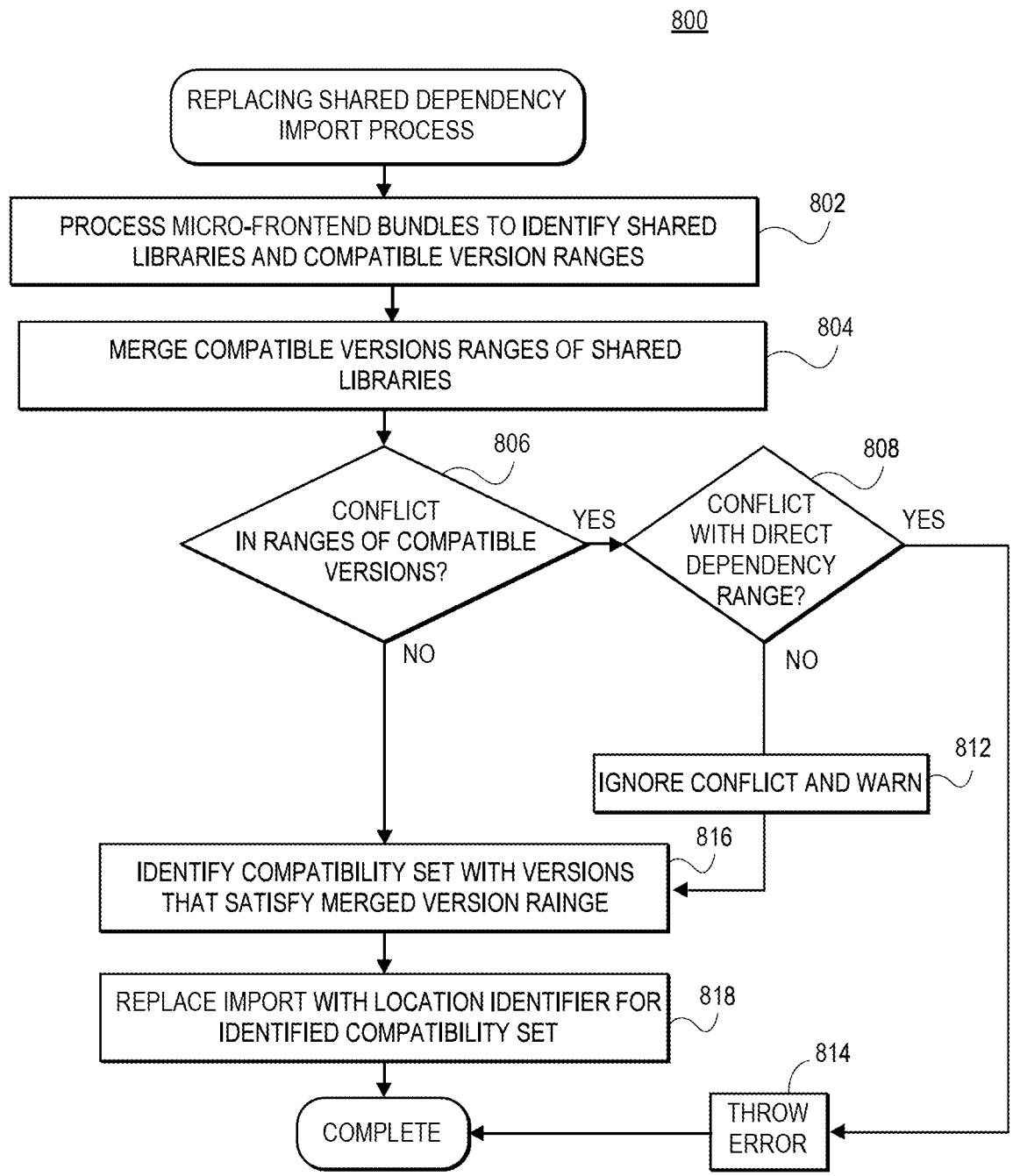
FIG. 8 is a flow diagram of an exemplary shared dependency import replacement process, according to exemplary embodiments of the present disclosure.

FIG. 8 is a flow diagram of an exemplary shared dependency import replacement process 800, according to exemplary embodiments of the present disclosure.

As shown in FIG. 8, exemplary shared dependency import replacement process 800 may being with processing of the micro-frontend bundles to identify the shared libraries to be deduplicated and the compatible version ranges of the shared libraries, as in step 802. In step 804, the ranges of compatible versions of the shared library may be merged. This may include, for example, determining a union (e.g., overlap, etc.) of the determined compatible versions of the dependencies/libraries. Accordingly, in step 806, it may be determined whether a conflict exists among the compatible version ranges among the shared dependencies/libraries. If no conflict exists, in step 816 the compatibility sets including versions of the dependency/library that satisfy the merged range of compatible versions may be identified from the compatibility sets stored on the CDN, and, in step 818, the imports may be replaced with the location identifier corresponding to the identified compatibility set that includes the versions of the dependency/library that satisfy the merged version range. For example, if the versions of the dependencies/libraries specified by the imports are available, the version of the dependency/library specified by the imports may be selected, and the imports may be replaced with the location identifier corresponding to the selected version of the dependency/library. However, in exemplary implementations where the version specified in the import statement is unavailable, but versions of the dependency/library satisfying the range of compatible versions are available, an available version of the dependency/library may be selected, and the imports with a location identifier corresponding to the available version of the dependency/library, which may result in an "upgrade" or "downgrade" to a more recent or previous version of the dependency/library, respectively. According to aspects of the present disclosure, the selected version may correspond to a dependency/library compatibility, which may have been created in accordance with exemplary dependency compatibility set creation process 700.

However, if a conflict is determined to exist in step 806, exemplary embodiments of the present disclosure may distinguish between direct dependencies and peer dependencies, and direct dependencies may be given priority. Accordingly, in the event that a conflict exists, in step 808 it is further determined whether the conflict is with respect to a direct dependency from the micro-frontend (and not a peer dependency). If it is determined that the conflict is with respect to a direct dependency, an error may be triggered, as in step 814, and process 800 may complete.

However, if the conflict is not with respect to a direct dependency, the conflict may be ignored and a warning may be thrown, as in step 812, and compatibility sets including versions of the dependency/library satisfying the merged range of compatible versions for the direct dependencies may be identified, as in step 816. For example, the compatibility set including the most recent version of the dependency/library that satisfies the range of compatible versions the direct dependencies may be identified. In step 818, the imports may be replaced with the location identifier corresponding to the identified compatibility sets including the compatible versions of the dependency/library. According to aspects of the present disclosure, the selected version may correspond to a dependency/library compatibility, which may have been created in accordance with exemplary dependency compatibility set creation process 700.

Accordingly, after the imports have been replaced with location identifiers specifying the networked location of the corresponding dependencies/libraries, the micro-frontend bundles can natively import the dependencies/libraries from the network locations specified by the location identifiers, so that the dependencies/libraries can be obtained once and shared between the various micro-frontend bundles.

Figure 9:
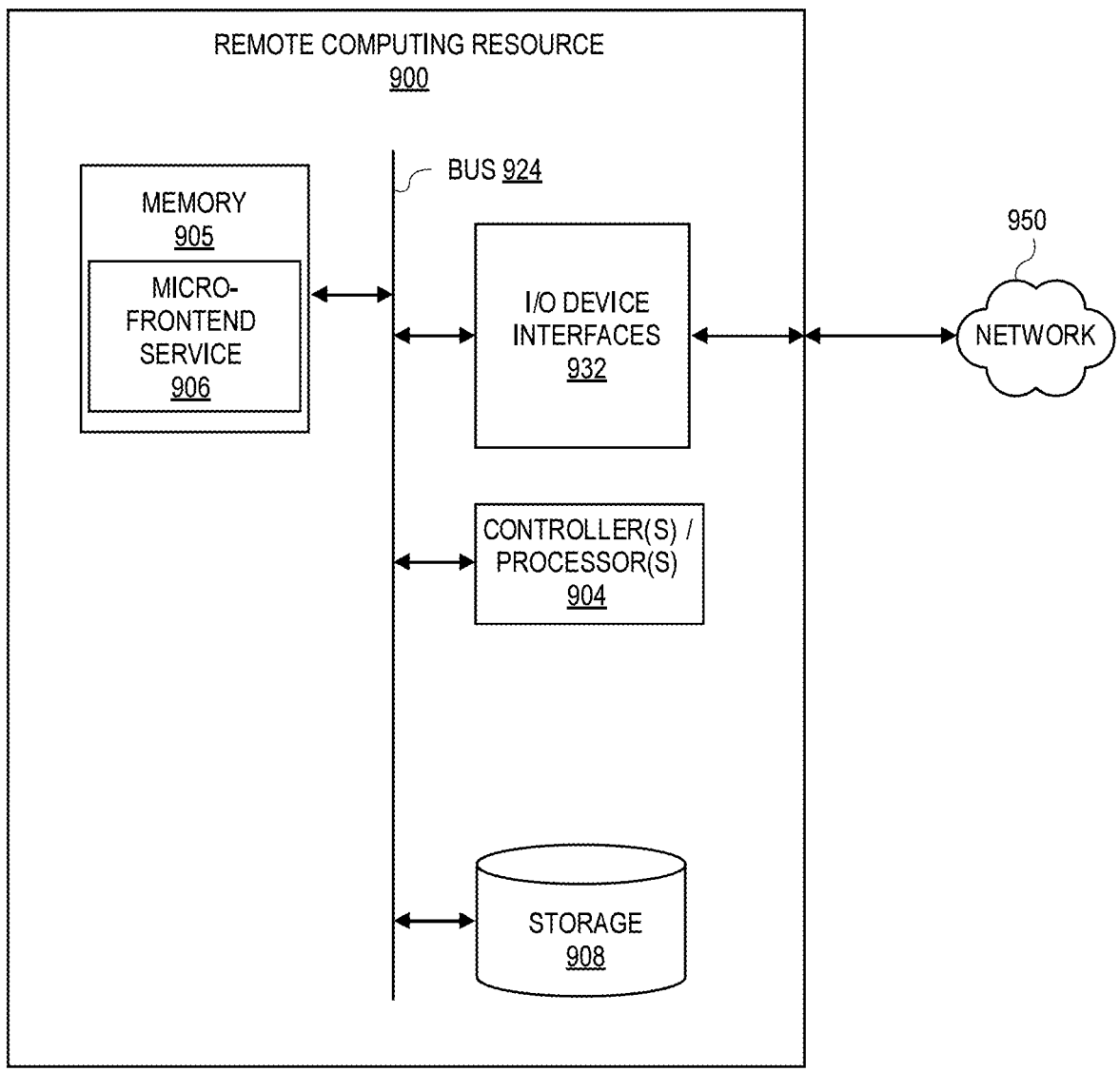
FIG. 9 is a block diagram of an exemplary remote computing device on which exemplary embodiments of the present disclosure may be executed.

FIG. 9 is a block diagram conceptually illustrating example components of a server and/or remote computing device, such as remote computing resource 900, on which exemplary embodiments of the present disclosure may be executed. Multiple such remote computing resources 900 may be included in the system.

Remote computing resource 900 may include one or more controllers/processors 904, that may each include a central processing unit (CPU) for processing data and computer-readable instructions, and memory 905 for storing data and instructions. Memory 905 may individually include volatile random-access memory (RAM), non-volatile read only memory (ROM), non-volatile magnetoresistive (MRAM) and/or other types of memory. Each remote computing resource 900 may also include a data storage component 908, for storing data, controller/processor-executable instructions, micro-frontends, micro-frontend information (e.g., package information, manifests, etc.), shared dependencies/libraries, location identifiers specifying the network locations of stored shared dependencies/libraries, and the like. Each data storage component 908 may individually include one or more non-volatile storage types, such as magnetic storage, optical storage, solid-state storage, etc. Each remote computing resource 900 may also be connected to removable or external non-volatile memory and/or storage (such as a removable memory card, memory key drive, networked storage, etc.), internal, and/or external networks 950 (e.g., the Internet) through respective input/output device interfaces 932.

Computer instructions for operating each remote computing resource 900 and its various components may be executed by the respective server's controller and/or processor(s) 904, using the memory 905 as temporary "working" storage at runtime. Remote computing resource 900's computer instructions may be stored in a non-transitory manner in non-volatile memory 905, data storage component 908, and/or an external device(s). Alternatively, some or all of the executable instructions may be embedded in hardware or firmware on the respective device, in addition to or instead of software.

For example, memory 905 may store program instructions that, when executed by the controller(s)/processor(s) 904, cause the controller(s)/processors 904 to provision applications employing a micro-frontend architecture using micro-frontend service 906 to deduplicate shared dependencies and/or libraries, as discussed herein.

Each remote computing resource 900 includes input/output device interfaces 932. A variety of components may be connected through the input/output device interfaces. Additionally, each remote computing resource 900 may include address/data bus 924 for conveying data among components of the respective server. Each component within remote computing resource 900 may also be directly connected to other components, in addition to (or instead of) being connected to other components across bus 924.

The components of remote computing resource 900, as illustrated in FIG. 9, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 5-8, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computing system, comprising:
   one or more processors; and
   a memory storing program instructions that, when executed by the one or more processors, cause the one or more processors to at least:
      obtain a library from a networked computing resource;
      process the library to convert the library to a library package in a compatible format;
      generate, based at least in part on the library package, a compatibility set including the library package;
      store the compatibility set at a network location specified by a location identifier;
      obtain:
         a first frontend bundle including a first import statement importing the library; and
         a second frontend bundle including a second import statement importing the library, wherein the first frontend bundle and the second frontend bundle are fragments of a frontend application; and
      replace:
         the first import statement of the first frontend bundle with a first reference to the location identifier; and
         the second import statement of the second frontend bundle with a second reference to the location identifier.

2. The computing system of claim 1, wherein the networked computing resource includes a package registry.

3. The computing system of claim 1, wherein the compatible format includes a module format.

4. The computing system of claim 1, wherein the program instructions that, when executed by the one or more processors, further cause the one or more processors to at least:
   integrate the first frontend bundle and the second frontend bundle into the frontend application, so that the library is natively loaded from the network location specified by the location identifier and the library is not individually bundled with the first frontend bundle and the second frontend bundle.

5. A computer-implemented method, comprising:
   receiving, from a client device, a request to access a frontend application;
   obtaining a first frontend bundle associated with the frontend application and including a first import statement importing a library;
   obtaining a second frontend bundle associated with the frontend application and including a second import statement importing the library;
   determining a first library version from a plurality of library versions hosted at a network location specified by a location identifier that is compatible with the first frontend bundle and the second frontend bundle;
   replacing the first import statement of the first frontend bundle with a first reference to the location identifier;
   replacing the second import statement of the second frontend bundle with a second reference to the location identifier; and
   integrating the first frontend bundle and the second frontend bundle into the frontend application so that the first library version hosted at the network location specified by the location identifier is natively loaded from the network location and the library is not individually bundled with the first frontend bundle and the second frontend bundle.

6. The computer-implemented method of claim 5, further comprising:
   obtaining a library package from a networked computing resource;
   processing the library package to convert the library package to a compatible format,
   generating, based at least in part on the library package, the plurality of library versions; and
   storing each of the plurality of library versions at a respective network location specified by a respective location identifier.

7. The computer-implemented method of claim 6, wherein processing the library package to convert the library package to the compatible format includes at least:
   identifying at least one transitive dependency of the library package;
   determining that the at least one transitive dependency is to be bundled separately; and
   in response to the determination that the at least one transitive dependency is to be bundled separately, recursively bundling each of the at least one transitive dependencies as a respective transitive dependency package in the compatible format.

8. The computer-implemented method of claim 7, wherein generating the plurality of library versions includes at least:
   generating a dependency topology based at least in part on the at least one transitive dependency;
   determining compatible versions of each of the at least one transitive dependencies; and generating, based at least in part on the dependency topology and the compatible versions of each of the at least one transitive dependencies, a plurality of compatibility sets as the plurality of library versions.

9. The computer-implemented method of claim 5, further comprising:
   determining, based at least in part on the first frontend bundle, a first range of compatible versions indicating a first version range with which the first frontend bundle is compatible;
   determining, based at least in part on the second frontend bundle, a second range of compatible versions indicating a second version range with which the second frontend bundle is compatible; and
   determining, based at least in part on the first version range and the second version range, a merged range of compatible versions,
   wherein determining the first library version that is compatible with the first frontend bundle and the second frontend bundle is based at least in part on the merged range of compatible versions.

10. The computer-implemented method of claim 9, further comprising:
    determining a first import version of the library imported by the first import statement;
    determining that the first import version is unavailable; and
    identifying a second library version from the plurality of library versions that is different than the first import version and satisfies the merged range of compatible versions as the first library version.

11. The computer-implemented method of claim 9, wherein determining the merged range of compatible versions prioritizes direct dependencies over peer dependencies.

12. The computer-implemented method of claim 9, wherein each of the plurality of library versions includes a set of compatible libraries.

13. The computer-implemented method of claim 9, further comprising:
    determining a conflict between the first range of compatible versions and the second range of compatible versions;
    determining that the conflict is based on a direct dependency; and
    generating an error condition and preventing integrating of the first frontend bundle and the second frontend bundle.

14. The computer-implemented method of claim 9, further comprising:
    determining a conflict between the first range of compatible versions and the second range of compatible versions;
    determining that the conflict is based on a peer dependency; and
    generating a warning condition and continuing with the integrating of the first frontend bundle and the second frontend bundle.

15. A computing system, comprising:
    one or more processors; and
    a memory storing program instructions that, when executed by the one or more processors, cause the one or more processors to at least:
      obtain a library from a networked computing resource;
      process the library to convert the library to a plurality of library packages in a compatible format, wherein processing the library includes:
        identifying at least one transitive dependency of the library;
        determining that the at least one transitive dependency of the library is to be bundled separately;
        in response to the determination that the at least one transitive dependency is to be bundled separately, recursively bundling each of the at least one transitive dependencies as a respective transitive dependency package in the compatible format; and
        bundling the library into a library package in the compatible format;
      generate, based at least in part on the plurality of library packages, at least one compatibility set of library packages; and
      storing each of the at least one compatibility set of library packages at a corresponding network location specified by a corresponding location identifier.

16. The computing system of claim 15, wherein generating the at least one compatibility set of library packages includes:
    generating, for each of the plurality of library packages, a dependency topology based at least in part on the at least one transitive dependency;
    determining compatible versions of each of the at least one transitive dependencies; and
    generating, based at least in part on the dependency topology and the compatible versions of each of the at least one transitive dependencies, the at least one compatibility set of library packages.

17. The computing system of claim 15, wherein the program instructions that, when executed by the one or more processors, cause the one or more processors to at least:
    obtain a first frontend bundle associated with a frontend application and including a first import statement importing the library;
    obtain a second frontend bundle associated with the frontend application and including a second import statement importing the library;
    determine a first library version from the at least one compatibility set of library packages hosted at a first corresponding network location specified by a first corresponding location identifier that is compatible with the first frontend bundle and the second frontend bundle;
    replace the first import statement of the first frontend bundle with a first reference to the first corresponding location identifier;
    replace the second import statement of the second frontend bundle with a second reference to the first corresponding location identifier; and
    integrate the first frontend bundle and the second frontend bundle into the frontend application so that the first library version hosted at the first corresponding network location specified by the first corresponding location identifier is natively loaded from the first corresponding network location and the library is not individually bundled with the first frontend bundle and the second frontend bundle.

18. The computing system of claim 17, wherein determining the first library version includes:
    determining, based at least in part on the first frontend bundle, a first range of compatible versions indicating a first version of the library with which the first frontend is compatible;
    determining, based at least in part on the second frontend bundle, a second range of compatible versions indicating a second version of the library with which the second frontend is compatible; and determining, based at least in part on the first version and the second version, a merged range of compatible versions, wherein determining the first library version that is compatible with the first frontend bundle and the second frontend bundle is based at least in part on the merged range of compatible versions.

19. The computing system of claim 18, wherein determining the merged range of compatible versions prioritizes direct dependencies over peer dependencies.

20. The computing system of claim 18, wherein the program instructions that, when executed by the one or more processors, cause the one or more processors to at least:

determine a first import version of the library imported by the first import statement;

determine that the first import version is unavailable in the at least one compatibility set of library packages; and identify a second library version from the at least one compatibility set of library packages that is different than the first import version and satisfies the merged range of compatible versions as the first library version.

* * * * *